Figure 1:
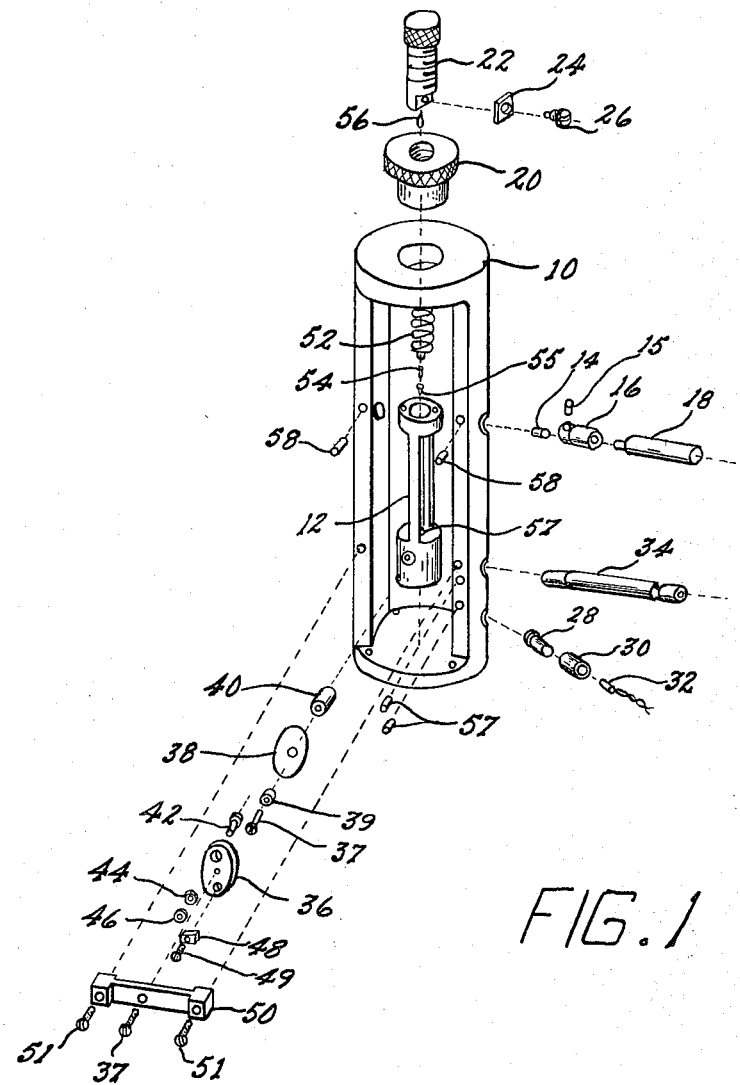

Nov. 15, 1966     E. G. MILLIS     3,286,229
LONG PERIOD HORIZONTAL SEISMOMETER

Filed March 31, 1964     2 Sheets-Sheet 1

INVENTOR.
EDWIN G. MILLIS

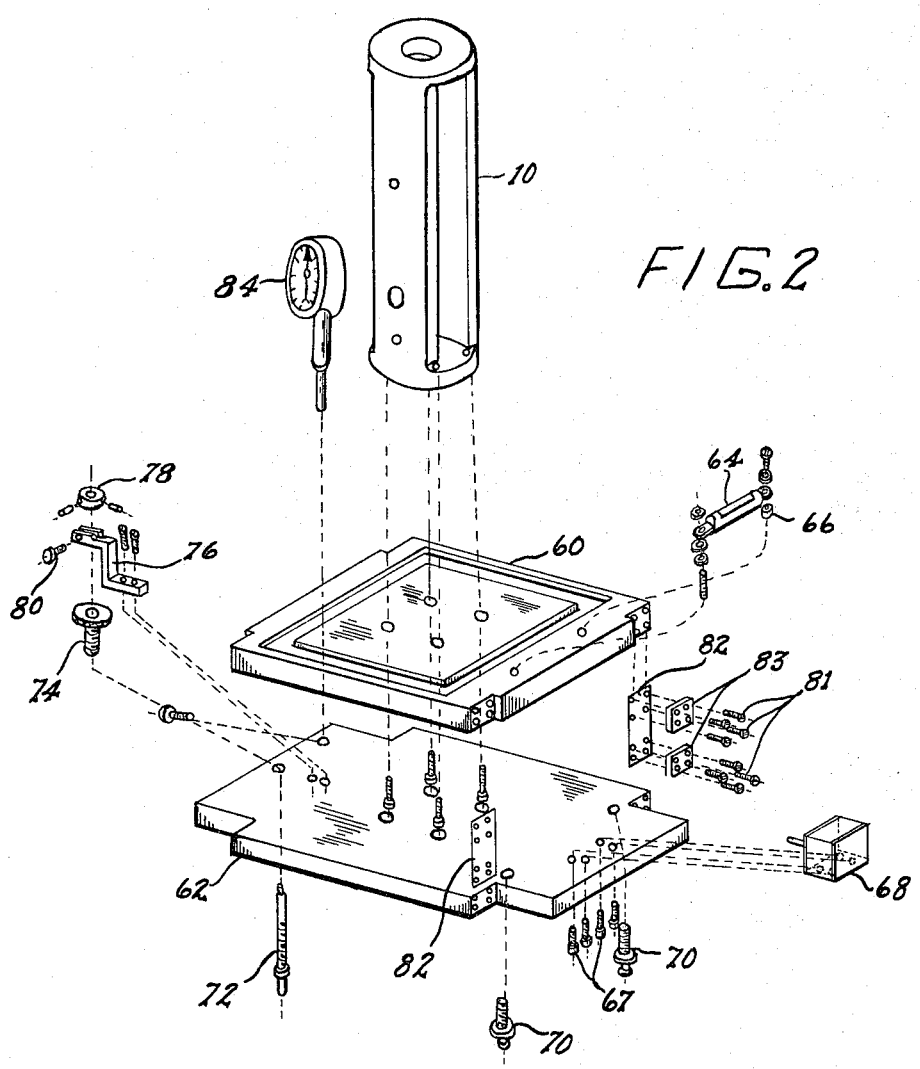

United States Patent Office 3,286,229
Patented Nov. 15, 1966

3,286,229
LONG PERIOD HORIZONTAL SEISMOMETER
Edwin G. Millis, Dallas, Tex., assignor to the United States of America as represented by the Secretary of the Air Force
Filed Mar. 31, 1964, Ser. No. 356,336
2 Claims. (Cl. 340—17)

This invention relates to long period horizontal seismometers and, more particularly, to a small portable instrument which is capable of great accuracy, may be transported from place to place and set up with very little recalibration. The seismometer of this invention is useful in detecting earth tremors in a horizontal direction and in addition to the detection of natural phenomena such as earthquakes, it is useful in detecting nuclear explosions.

There are many seismometers for detecting tremors in the earth's surface, both horizontal and vertical, and it is desirous to have such an instrument with a long natural period of vibration. Most instruments of moderate accuracy of this type are large, permanent installations. The invention to be described is small, weighing in the neighborhood of 30 pounds in the embodiment described herein, and of considerable accuracy.

It is an object of this invention, therefore, to provide a seismometer which can be readily moved from place to place and set up without extensive calibration.

It is a further object of this invention to provide a seismometer which is capable of great accuracy and which may be used with, and as an integral part of, a direct, digitizing, seismometer system.

It is a further object of this invention to provide a seismometer which can be easily manufactured from readily obtainable materials that lend themselves to standard mass production manufacturing techniques.

Other objects and advantages of this invention will be apparent upon inspection of the attached drawings which show one embodiment of the instrument.

In the drawings:

FIGURE 1 is an exploded view of a frame, pendulum and the adjusting devices for the pendulum of the seismometer of this invention; and FIGURE 2 is an exploded view showing the assembly of the frame with the base and stand.

Referring to the figures, there is shown a frame 10 which is in the form of a cylinder with portions of its vertical walls removed such that two legs are formed for containing supporting structure for some of the remaining elements of the seismometer. Mounted within the frame is a pendulum 12 of the same general shape as that of the frame and which is supported by means of a spring 52 at 57 by bolt 55 and stainless steel wire 54. The spring 52 is secured to the frame 10 by means of a spring adjustor 22 and 20. The spring adjustor arrangement 20 and 22 may be utilized to adjust the period of the instrument by varying the tension on the spring. A stainless steel wire 56 is clamped to the inside of spring adjustor 22 by means of bolt 26 and clamping washer 24. The inside spring adjustor 22 is threadably engaged in the outside spring adjustor piece 20 which in turn is inserted in a hole at the top of the frame 10. In practice, the inner piece 22 is held stationary and the outer piece 20 is rotated. The two pieces may be rotated together to take any residual twist out of the suspension spring 52 without changing the tension.

The frame 10, the pendulum 12 and the spring adjustor means 20 and 22 are all machined from Invar for thermal stability. The use of Invar for these parts is important in that the coefficient of expansion of Invar due to change in temperature is approximately zero. For example, calculations show that the period of oscillation of this instrument would change only about .02 percent per degree centigrade, due to changes in geometry of Invar pieces. If brass were used for these parts, the temperature coefficient of the period would cause a change of .3 percent per degree centigrade.

The spring 52 forms an important part of the instrument in that it largely determines its period of vibration. The spring is wound from .035 diameter Ni-Span "C" wire. This wire is wound on a 7/16th inch diameter mandrel without any pretension and is then turned inside out to make it approximately zero length. The spring blank is then heat treated in accordance with the specification set up by Engelhard Industries, the manufacturer of the wire utilized, in order to give a thermoelastic coefficient of zero with a possible error of about $\pm 4(10)^{-6}$ per degree centigrade. The spring is then cold worked in order to render the spring more stable with respect to creep. Hooks are then formed at the ends of the springs for attachment to the loops on the stainless steel wires 54 and 56.

The pendulum is also supported by means of pivots 14 which may be of the type known as Bendix "Free-flex" Flexural Pivots, type 5004–800. These pivots are very important in that they determine to a large extent the period of vibration of the pendulum. For longer periods, pivots with less restoring force would be required. Although one pivot is shown in the drawing, a duplicate arrangement would be inserted into the frame 10 at a diametrically opposite position. The frame 10 is bored to accommodate the pivot 14, which is secured in a pivot holder 16 by means of a set screw 15, and is inserted by means of a pivot holder handle 18 which is arranged to engage the pivot holder 16. Of course, the pendulum 12 has suitable apertures for providing a bearing surface for the ends of the pivots 14. It has been found that by loading the pivots in tension, the restoring force is decreased and actual loading provides a restoring rate of about .002 inch-pound per radian per pivot. The housing 10 is suitably bored and threaded for set screws 58 which are arranged to engage the pivot holders 16 once they are set in position.

Further damping is provided by means of a pair of air cup dampers used in a push-pull arrangements to eliminate the possibility of a directional difference in damping. The units comprise a spacer element 40 and a damper piston 38 which are secured by means of a bolt 37 and washer 39 to the lower portion of the piston 12. The damper piston 38 is fitted within a damping cylinder 36 with the diameter of the piston allowing a .006 inch radial clearance. The cylinder has a hole therein through which a damper valve body 42 is presented to be received by a damper valve nut 44 and adjusting means 46. Thus, damping is set by adjusting the air bleed of elements 42 and 46. The damper cylinder 36 may be adjusted to limit the pendulum displacement and comprises the damper support bracket 50, which is secured by means of bolts 51 to the upstanding portions of the frame 10, and a lock spring 48 with its assembled bolt 49 which are arranged to be secured to the damper cylinder. Although only one damper arrangement is shown, the device utilizes a pair in diametrically opposed positions.

In order to define the mechanical zero of the instrument as well as for leveling the instrument in the direction of motion, a microscope 34 is set in a bore in the main frame and is focused on a scribed line (not shown) on the pendulum mass. The microscope is calibrated in one-thousandth inch increments. In order to illuminate the pendulum a lamp 28, which fits in a lamp bushing 30 with a lamp socket 32, is arranged also to fit within a bore in the upstanding leg of the main frame 10. Set screws 57 are used to clamp the microscope 34 and lamp assembly 28, 30, 32 in the main frame.

The frame 10 with the pendulum assembled therein is secured to a base 60 by machine screws 61. The base is then assembled to a stand 62 by means of four beryllium-copper leaf springs 82. These springs are assembled to the base 60 and the stand 62 by clamps 83 and machine screws 81 as shown in FIGURE 2. A bubble level 64 is fastened to the base 60 as shown in FIGURE 2 to determine the approximate level of the base in a plane transverse to the direction of motion. The stand is leveled in the aforesaid direction by two conventional leveling legs 70. A special vernier leveling leg 72, which screws into a vernier leveling screw 74 is used to level the instrument in the direction of motion. The upper part of leg 72 fits in a split clamp 76 and is fixed to a knob 78 by set screws which enables the leg to be turned in the vernier level screw 74 when a set screw 80 is loosened in the said clamp 76. The leveling leg 72 has 20 threads to the inch and the leveling screw 74 has 18. Consequently, when the leveling leg is screwed up into the leveling screw and the leveling screw is turned down into the stand, the net result is a vernier action giving the equivalent of 180 threads to the inch.

As a further damping means and in the interest of a long period of vibration a conventional dashpot 68, filled with silicone oil is connected between the base and the stand, as shown in FIGURE 2 by means of screws 67. A dial indicator, 84, may be placed in the stand 62 to assist in leveling the said stand initially or as a means of putting a calculated tilt to the instrument.

While the embodiment of this invention described herein has no means incorporated in it for recording earth tremors or movements of the pendulum and is therefore merely a seismometer and not a seismograph, it is intended to be used with an electronic direct digitizing device for recording such tremors. In addition, conventional heating means for thermal stabilization of the device may be provided.

It is proposed to ship this seismometer with the pendulum in place. The pivots can be easily removed, and replaced with a set of solid steel "shipping pivots." The suspension spring will be left in place and secured with balsa wood wedges where it passes through the top of the pendulum. The pendulum stop adjustment screws will be carefully tightened to clamp the pendulum and eliminate free play. This method of shipping does not interfere with the setting of the dampers or the period adjustment; therefore, the instrument should require minimum calibration and readjustment after shipping.

And now having described a frame, a novel pendulum and suspension system for the same for use in a long period horizontal seismometer, I claim:

1. In a seismometer for the detection of earth tremors in a horizontal direction comprising, a cylindrical frame, said frame having a longitudinal opening therethrough and a bore at one end, a pendulum mounted within said frame, mounting means comprising a pair of pivots extending from said frame into said pendulum at one end thereof, a spring, a loop of stainless steel wire secured to each end of said spring, one of said loops being fixed to said pendulum remote from said pivots and the other of said loops being adjustably secured to said frame, a male and female relatively adjustable attachment means mounted in said bore at one end of said frame; said male attachment means being secured to said other of said loops, and a pair of damping means mounted at diametrically opposed positions on said frame and secured to said pendulum at a position remote from said pivots.

2. In a seismometer as defined in claim 1 including a base on which said frame is mounted, a stand beneath said base, resilient spring means connecting said base with said stand, a dashpot mounted to said base and stand, and leveling legs secured to said stand.

References Cited by the Examiner
UNITED STATES PATENTS

| | | | |
|---|---|---|---|
| 1,552,186 | 9/1925 | Anderson | 73—71.1 |
| 3,065,456 | 11/1962 | Alexander | 340—17 |
| 3,212,057 | 10/1965 | Romberg | 340—17 |

OTHER REFERENCES

Kithil, K. L.: Geologizing with Dynamite, Explosives Engineer, February 1926, pp. 45–47.

BENJAMIN A. BORCHELT, *Primary Examiner.*

P. A. SHANLEY, *Assistant Examiner.*